United States Patent [19]

Oberhauser et al.

[11] Patent Number: 4,769,306

[45] Date of Patent: Sep. 6, 1988

[54] ANTI-REFLECTION LAYER OF SILICA MATRIX WITH FLUORINATED POLYLMER PARTICLES

[75] Inventors: David F. Oberhauser, Stoneham; Peter H. Roth, Needham, both of Mass.

[73] Assignee: Polaroid Corporation, Cambridge, Mass.

[21] Appl. No.: 100,031

[22] Filed: Sep. 23, 1987

[51] Int. Cl.[4] .......................... G03C 5/54; G03C 1/78; B32B 27/00; B32B 9/04

[52] U.S. Cl. .................................... 430/220; 430/227; 430/523; 430/535; 430/536; 430/950; 430/961; 430/497; 350/276 R; 428/421; 428/422; 428/446

[58] Field of Search ............... 430/215, 220, 535, 536, 430/523, 227, 950'961, 497; 350/276 R; 428/421, 422, 446

[56] References Cited

U.S. PATENT DOCUMENTS

| | | | |
|---|---|---|---|
| 3,047,421 | 7/1962 | Taylor | 428/422 |
| 3,793,022 | 2/1974 | Land et al. | 430/220 |
| 3,833,368 | 9/1974 | Land et al. | 430/220 |
| 4,047,804 | 9/1977 | Stephens | 430/950 |

*Primary Examiner*—Richard L. Schilling
*Attorney, Agent, or Firm*—Stanley H. Mervis

[57] ABSTRACT

Photographic film units are disclosed which incorporate an anti-reflection layer comprising a matrix of silica having dispersed therein particles of a fluorinated polymer. Viewing of the image and/or photoexposure are effected through the anti-reflection layer.

8 Claims, No Drawings

ANTI-REFLECTION LAYER OF SILICA MATRIX WITH FLUORINATED POLYLMER PARTICLES

This invention is concerned with photographic film units having anti-reflection layers, particularly film units for forming diffusion transfer images in color or in black and white.

BACKGROUND OF THE INVENTION

U.S. Pat. No. 3,793,022, issued Feb. 19, 1974 to Edwin H. Land, Stanley M. Bloom and Howard G. Rogers, discloses film units for forming integral diffusion transfer images, the film units including an anti-reflection layer through which the image is viewed and/or photoexposure is effected. The anti-reflection layer preferably is a quarter-wave thick and preferably comprises a fluorinated polymer, and such layers are coated using organic solvents. Such an anti-reflection layer has been utilized in various Polaroid Land film units, including SX-70 color film.

U.S. Pat. No. 3,833,368, issued Sept. 3, 1974 to Edwin H. Land and Stanley M. Bloom, discloses the provision of such an anti-reflection layer by the use of the combination of an eighth-wave thick layer of silica and an eighth-wave thick layer of a fluorinated polymer. Again, it is necessary to utilize organic solvents to apply the layer of fluorinated polymer.

Concerns of cost and environmental controls make it desirable to minimize or avoid the use of organic solvents.

SUMMARY OF THE INVENTION

The present invention provides anti-reflection layers coatable from aqueous solution. The anti-reflection layers comprise a matrix of silica having dispersed therein particles of a fluorinated polymer.

DETAILED DESCRIPTION OF THE INVENTION

Photographic film units designed to produce integral diffusion transfer images are described in the above-mentioned U.S. Pat. Nos. 3,793,022 and 3,833,368, and in various other patents, e.g., U.S. Pat. No. 4,489,152, issued Dec. 18, 1984 to David F. Oberhauser and Peter H. Roth. In general, such film units comprise a pair of sheets, each including at least a support. One of the supports carries the photosensitive layer(s). An image-receiving layer is carried by one of the supports, and the photosensitive layer(s) and the image-receiving layer may be on the same or different supports. Depending upon the particular film configuration, one or both of the supports are transparent in order to expose the photosensitive layer(s) and to view the transfer image. The supports preferably are polyethylene terephthalate. A light-reflecting layer, either preformed or formed in situ by spreading a pigmented processing fluid, provides a white background for the transfer image and also serves to mask the developed photosensitive layer(s). If the film unit is to be processed outside the camera, i.e., in ambient light, suitable opacification means (e.g., as described in U.S. Pat. No. 3,647,437 issued Mar. 7, 1972 to Edwin H. Land, and in U.S. Pat. No. 3,594,165, issued June 20, 1971 to Howard G. Rogers) are provided to protect the developing film from being fogged.

For convenience, the specific descriptions of film unit structures set forth in the aforementioned U.S. Pat. Nos.

3,793,022, 3,833,368 and 4,489,152 are hereby expressly incorporated herein by reference.

The anti-reflection layer of the present invention comprises a matrix of silica having dispersed therein particles of a fluorinated polymer. The anti-reflection layer preferably has an index of refraction at least 0.20 less than that of the transparent support on which it is coated. The preferred transparent support is polyethylene terephthalate which has an index of refraction of about 1.64.

The fluorinated polymer should be water-insoluble and have a low index of reflection, preferably below about 1.40. Particularly useful and preferred fluorinated polymers are fluorinated olefins, such as polytetrafluoroethylene which is commercially available as a 50% by weight aqueous dispersion (containing some methanol) from ICI Americas, Inc., Wilmington, Del., under the tradename "Fluon L-171", and a water based dispersion of hexafluoropropylene/tetrafluoroethylene copolymer particles commercially available from E. I. du Pont de Nemours, Wilmington, Del., under the tradename "Teflon 30".

The stratum is preferably provided by use of a colloidal silica. Colloidal silica as used herein is intended to refer to aqueous sols of widely dispersed discrete particles which are essentially amorphous silica ($SiO_2$). The silica particles preferably are extremely small, being on the order of about 15 millimicrons or even smaller, e.g., about 7 millimicrons. The silica particles may have a small quantity of sodium ions on the surface to prevent agglomeration. Particularly useful colloidal silicas are the sols of colloidal silica comprising aqueous colloidal dispersions of surface-hydroxylated silica commercially available from E. I. du Pont de Nemours Co., Wilmington, Del., under the tradename "Ludox" colloidal silica. On dry-down, surface hydroxyl groups on the silica particles induce coalescence and interparticle bonding results. The index of refraction of silica strata obtained from such colloidal silica in the absence of the particles of fluorinated polymer is about 1.41 to 1.46.

In the preferred embodiments, the surface of polyethylene terephthalate film base has been treated or subcoated to facilitate application thereto of an aqueous coating. A subcoat of the type described in U.S. Pat. No. 4,135,932, issued Jan. 23, 1979 to David R. Mann, has been found to be useful in obtaining good adhesion of the silica anti-reflection layer of this invention.

The principles of physics by which anti-reflection coatings function are well known. Thus, it is well known that application of a single layer transparent coating will reduce surface reflection from a transparent layer (support) if the refractive index of said coating is less than that of the transparent layer to which it is applied and the coating is of appropriate optical thickness. In the photographic products with which this invention is concerned, the anti-reflection coating will normally be in optical contact with air. Under these circumstances, and because the index of refraction of air is 1, the applicable principles of physics give the following rule: if the index of refraction of the coating material (anti-reflection layer) is exactly equal to the square root of the index of refraction of the substrate (transparent support), then all surface reflection of light will be eliminated for that wavelength at which the product of the refractive index times thickness is equal to one-quarter of that wavelength. At other wavelengths the destructive interference between light reflected from the top and bottom surfaces of the anti-reflection coating is not complete but a substantial reduction in overall reflectivity is obtained. By selecting the optical thickness of the anti-reflection coating to be one-quarter of a wavelength, or an uneven multiple thereof, e.g., "three-quarter wave", for approximately the midpoint of the visible light wavelength range (i.e., one-quarter of 5,500 Angstroms or about 1,400 Angstroms), the reduction in reflectivity is optimized. The term "optical thickness" as used herein refers to the product of the physical thickness of the coating times the refractive index of the coating material. As used herein the expression "quarter-wave" refers to coatings having an optical thickness one-quarter of a predetermined wavelength of light, said wavelength being 5,500 Angstroms. In the preferred embodiments of the present invention, the anti-reflection layer has a three-quarter wave optical thickness as this has been found to give coatings of greater resistance to abrasion or ruboff than quarter-wave coatings.

EXAMPLE 1

A film unit of the type shown in the Figure of the above-mentioned U.S. Pat. No. 4,489,152 was prepared by the use of a transparent polyethylene terephthalate support 12 for the image-receiving layer 14. On the other surface of the transparent polyethylene terephthalate support (having a hydrophilic subcoat of the type in U.S. Pat. No. 4,135,932) an anti-reflection layer was coated using an aqueous coating composition comprising:

| | |
|---|---|
| "Ludox LS-30" (32.1% solids) | 96.6 g. |
| "Teflon 30" (60.3% solids, 5.5% Triton X-100 wetting agent) | 12.9 g. |
| Isopropanol | 132.4 g. |
| An aqueous latex copolymer of butyl acrylate, diacetone arylamide, styrene, methacrylic acid and acrylic acid (60.6/29/6.3/3.7/0.4 ratio) (2.5% solids, pH 8.5) | 10.5 g. |
| Deionized water | 1,072.2 g. |

to give a dry coating of 48–49 mg./ft$^2$, corresponding to a three-quarter wave coating.

This coating was found to give good anti-reflection properties and good adhesion to the support. In addition, this coating was found to have good slip coat properties, particularly if moved across an underlying film unit; this good slip coat property is believed to be the result of at least some of the fluorinated polymer particles projecting from the surface of the silica matrix. The average size of the fluorinated polymer particles was about 0.5 micron, but the dispersion was not monodispersed.

EXAMPLE 2

The procedure described in Example 1 was repeated using the following aqueous coating composition:

| | |
|---|---|
| "Ludox LS-30" (32.1% solids) | 110 g. |
| "Teflon 30" (60.3% solids, 5.5% Triton X-100 wetting agent) | 14.7 g. |
| Isopropanol | 302.8 g. |
| An aqueous latex copolymer of butyl acrylate, diacetone arylamide, styrene, methacrylic acid and acrylic acid (60.6/29/6.3/3.7/0.4 ratio) (2.5% solids, pH 8.5) | 12.0 g. |
| Deionized water | 2,588.1 g. |

This coating solution contained 1.5% solids, and was coated at a coverage of 48 mg./ft$^2$. The anti-reflection layer was found to have similar properties.

Care should be exercised in drying the aqueous coating not to use temperatures which will cause the fluorinated particles to melt and form a film.

The small amount of non-fluorinated latex used in the above coatings was found to be helpful but was not essential to obtaining useful anti-reflection layers in accordance with this invention.

The ratio of silica to fluorinated polymer may vary considerably; good results have been obtained with ratios by weight of about 4:1 to 2:1. The index of refraction of anti-reflection layers coated from such ratios of silica to Teflon 30 fluorinated polymer has been calculated to be about 1.36–1.38.

As noted above, the anti-reflection layer of this invention imparts anti-abrasion and slip coat properties. Accordingly, such a layer of silica having particles of a fluorinated polymer dispersion therein may be used at a thickness other than an anti-reflection thickness, or coated on transparent supports such as surface hydrolyzed cellulose acetate where the difference in the indices of refraction is too small to have a significant anti-reflection function.

Polyester supports having anti-reflection layers of the above examples were found to exhibit resistivity in the $10^9$–$10^{10}$ ohm range, as compared with greater than $10^{14}$ ohm resistivity for polyester supports having anti-reflection layers composed of only fluorinated polymers. The reduced resistivity greatly reduced static-related defects in subsequent coatings on these supports.

What is claimed is:

1. A transparent polyester film base carrying on one surface an anti-reflection layer comprising a silica matrix having dispersed therein water-insoluble particles of a fluorinated polymer.

2. A transparent polyester film base as defined in claim 1 wherein said anti-reflection layer has a three-quarter wave optical thickness.

3. A transparent polyester film base as defined in claim 2 wherein said fluorinated polymer is polytetrafluoroethylene.

4. A transparent polyester film base as defined in claim 3 wherein said fluorinated polymer is a hexafluoropropylene/tetrafluoroethylene copolymer.

5. A transparent polyester film base as defined in claim 1 wherein the ratio by weight of silica to fluorinated polymer is about 4:1 to about 2:1.

6. A photographic product for use in diffusion transfer processes comprising a transparent polyester film base as defined in claim 1, wherein an image-receiving layer is carried on the other side of said film base from said anti-reflection layer.

7. A photographic film product comprising a first support and a second support, at least one of said supports being transparent, a plurality of layers including a photosensitive silver halide layer carried on one of said supports, and a rupturable container releasably holding a processing composition adapted, when distributed between a pair of predetermined layers carried by said supports, to develop said photosensitive layer and provide an image viewable through said transparent support, the external surface of said transparent support carrying an anti-reflection coating having an index of refraction less than said transparent support, said anti-reflection coating comprising a stratum of silica having water-insoluble particles of a fluorinated polymer dispersed therein.

8. A photographic film product as defined in claim 7 wherein said anti-reflection layer has a threequarter wave optical thickness.

* * * * *